US011683302B2

(12) United States Patent
Woodard et al.

(10) Patent No.: US 11,683,302 B2
(45) Date of Patent: Jun. 20, 2023

(54) AD HOC NETWORKS AND AUTHENTICATION SERVICES FOR VERIFYING CONTACTLESS DELIVERIES

(71) Applicant: NVIDIA Corporation, Santa Clara, CA (US)

(72) Inventors: Andrew Woodard, Buckinghamshire (GB); Benjemin Thomas Waine, Cheshunt (GB); Amy Rose, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 196 days.

(21) Appl. No.: 16/884,451

(22) Filed: May 27, 2020

(65) Prior Publication Data

US 2021/0377246 A1 Dec. 2, 2021

(51) Int. Cl.
*G06Q 50/28* (2012.01)
*H04W 12/77* (2021.01)
*G06K 19/06* (2006.01)
*H04L 9/40* (2022.01)
*H04W 84/18* (2009.01)
*H04L 51/224* (2022.01)

(52) U.S. Cl.
CPC ...... *H04L 63/083* (2013.01); *G06K 19/06037* (2013.01); *G06Q 50/28* (2013.01); *H04L 51/224* (2022.05); *H04W 84/18* (2013.01)

(58) Field of Classification Search
CPC ....... H04L 63/083; H04L 51/24; H04L 51/30; G06K 19/06037; G06Q 50/28; H04W 84/18; H04W 12/77; H04W 12/009; H04W 12/0431; H04W 12/069
See application file for complete search history.

(56) References Cited

U.S. PATENT DOCUMENTS 9,359,074 B2 * 6/2016 Ganesh ............. G06Q 10/0833
11,140,157 B1 * 10/2021 Xia ..................... H04L 63/0853
11,172,362 B2 * 11/2021 Yoon .................... H04L 9/3265
11,210,623 B2 * 12/2021 Barton ................ G06Q 10/083
(Continued)

OTHER PUBLICATIONS

"Contactless Delivery," Domino's. (2020) Retrieved from the Internet on May 1, 2020 from URL: <https://biz.dominos.com/web/media/contactless-delivery>.
(Continued)

*Primary Examiner* — Aftab N. Khan
(74) *Attorney, Agent, or Firm* — Taylor English Duma L.L.P.

(57) ABSTRACT

Verified deliveries are commonplace for various exchanges of goods, packages, and/or other items, but often require close proximity or contact between the exchanging parties or devices associated therewith—e.g., for digital or physical signature. To remedy this, system and methods described herein may leverage an ad hoc network established between a device of a provider and a device of a consumer for exchanging codes or tokens—that may be validated by an authentication service—to provide a verification process during an exchange between the parties. As a result, a safe distance may be maintained between the parties throughout the transaction—thereby avoiding exchange of germs while also increasing safety and security of both parties—and the verification process may be more reliable and secure.

20 Claims, 7 Drawing Sheets

(56) References Cited

U.S. PATENT DOCUMENTS

| | | | | |
|---|---|---|---|---|
| 2014/0351392 A1* | 11/2014 | Baker | ............... | H04L 41/0896 |
| | | | | 709/220 |
| 2016/0068264 A1* | 3/2016 | Ganesh | ............. | G06Q 30/0637 |
| | | | | 701/4 |
| 2017/0091699 A1* | 3/2017 | Mueller | ............... | H04W 4/023 |
| 2022/0261785 A1* | 8/2022 | Godet | ................... | G06Q 20/32 |

OTHER PUBLICATIONS

"No Contact Delivery from Papa John's," Papa John's International, Inc. (2020) Retrieved from the Internet on May 1, 2020 from URL: <https://www.papajohns.com/no-contact-delivery/>.

"We're Making Key Services Completely Contact Free," Walmart, Inc. (2020) Retrieved from the Internet on May 1, 2020 from URL: <https://corporate.walmart.com/newsroom/2020/03/27/were-making-key-services-completely-contact-free>.

* cited by examiner

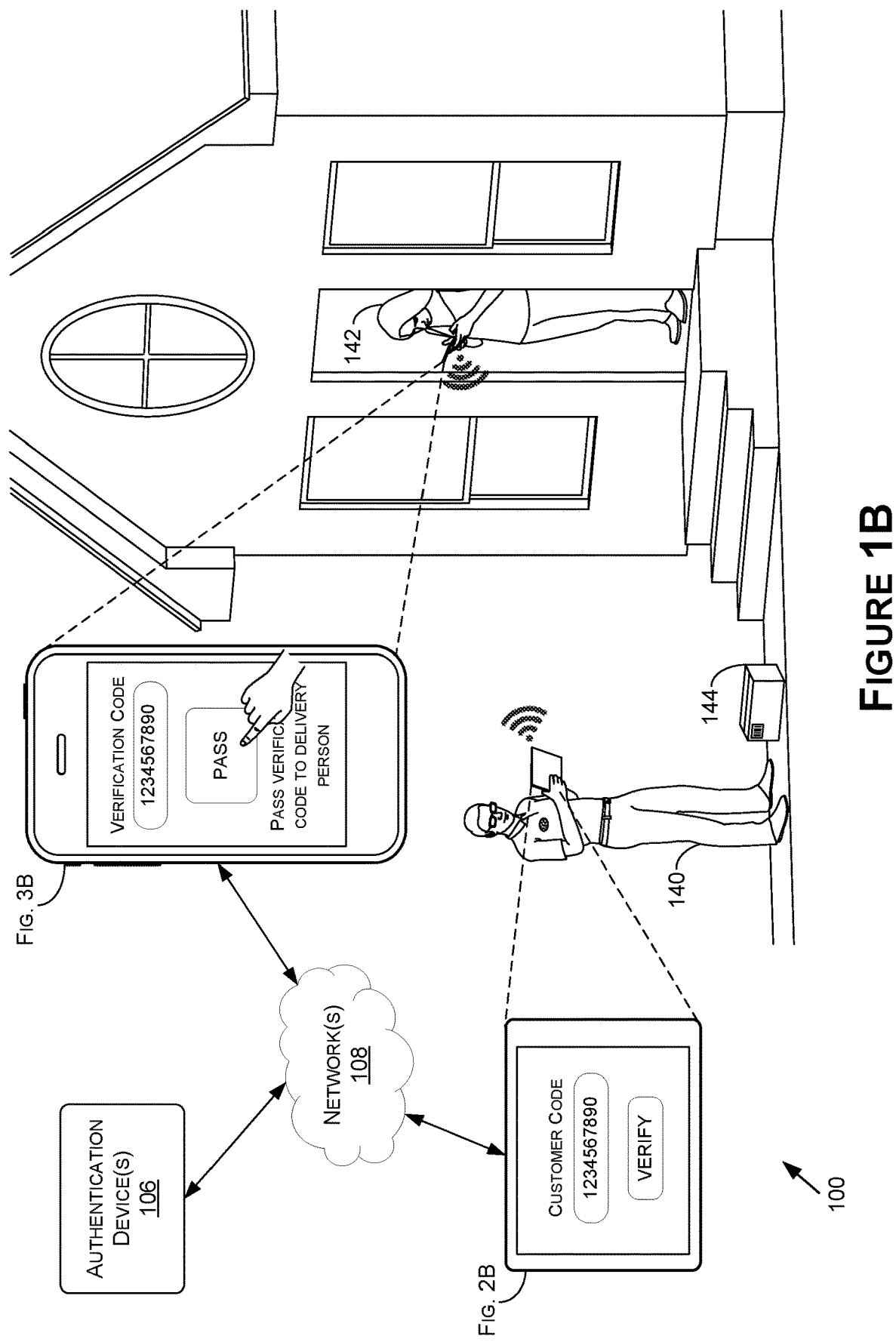

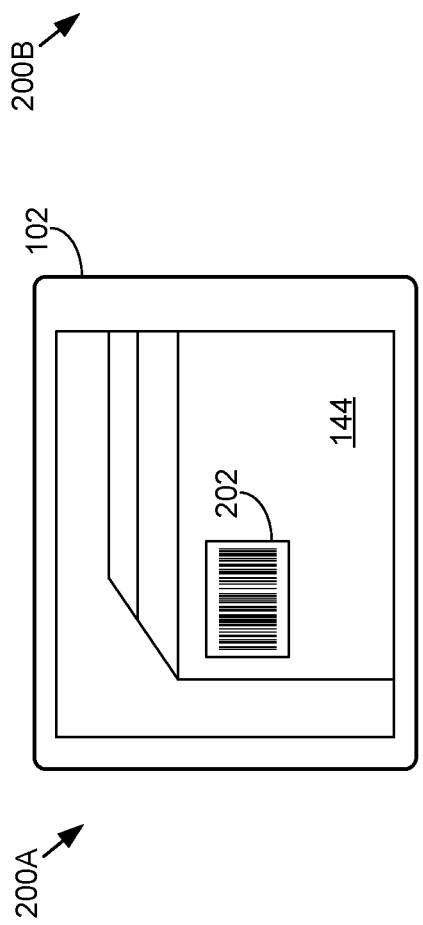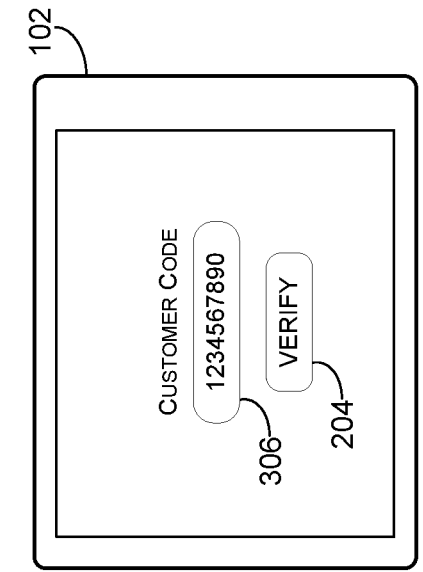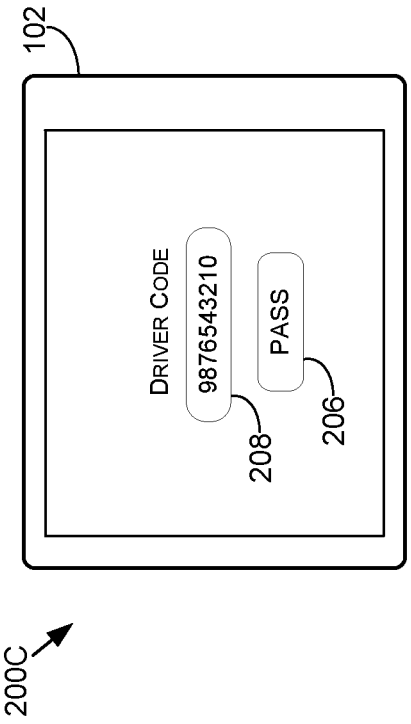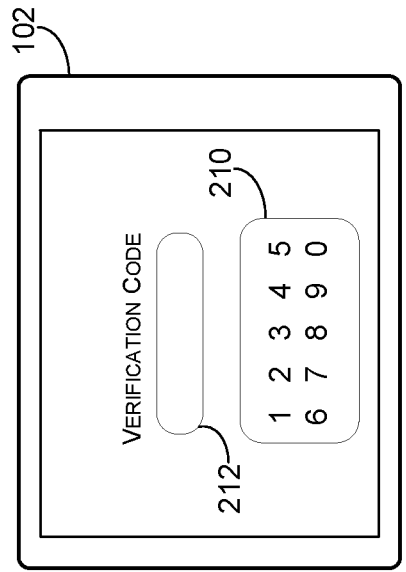

AD HOC NETWORKS AND AUTHENTICATION SERVICES FOR VERIFYING CONTACTLESS DELIVERIES

BACKGROUND

Package, parcel, item, food, beverage, and other delivery or pickup services—such as for high dollar value items, or items that require a receiver be of a certain age (e.g., for alcohol or prescription medications)—often require a signature for verifying a delivery or a pickup has been successfully completed. However, to acquire a signature, a hand-written or digital signature is often required of a consumer via a physical or digital signature pad of a delivery or vendor device. As a result, exchange of the delivery or vendor device may occur and/or the delivery or vendor personnel may come into close proximity or contact with the consumer—thereby increasing the potential for exchange of germs or bacteria, potentially decreasing the security and safety of the consumer, and/or violating suggested or required distancing measures (e.g., social distancing measures during a pandemic). Additionally, physically or digitally signed signatures may be easily forged, or may be complex to verify, leading to a greater potential of a dishonest exchange—e.g., the consumer may forge the signature or allege that the exchange was never completed, or the provider or vendor may allege that a successful exchange was completed when in fact, it was not. As such, existing technologies and techniques for package, item, or other exchanges not only require close or actual contact between both parties, but further allow various avenues for potential deceit in verifying that a successful exchange took place.

SUMMARY

Embodiments of the present disclosure relate to a contactless delivery verification system. Systems and methods are disclosed that allow for two-way verification between a providing party and a receiving party without requiring a physical signature or exchange of items (e.g., pen, notepad, stylus, smart device, digital signature pad, etc.) other than a package, parcel, item, service, or otherwise. For example, verification code or token exchanges may be executed between co-located delivery or vendor personnel and consumers, and validated or verified by an authentication service. The exchanges between devices of the delivery, vendor, or provider personnel and the consumers may be over an ad hoc network such that proximity between the parties is required—thereby reducing the ability for deceit by either party to the exchange—while close contact or proximity is avoided (e.g., the ad hoc network may allow parties to be sufficiently distanced from one another, or even on opposing sides of a barricade, such as inside and outside of a building). As a result, and in contrast to conventional systems, such as those described above, exchanges between providers and consumers may be completed that increase the safety and security of both parties, decrease the likelihood of exchange of germs or bacteria between the parties, and strengthen the verification and authentication validity of the exchanges.

BRIEF DESCRIPTION OF THE DRAWINGS

The present systems and methods for a contactless delivery verification system are described in detail below with reference to the attached drawing figures, wherein:

FIG. 1B depicts an example illustration of a parcel delivery using the contactless delivery verification system of FIG. 1A, in accordance with some embodiments of the present disclosure;

FIGS. 2A-2D depict example screenshots of a provider application at various stages of an exchange, in accordance with some embodiments of the present disclosure;

DETAILED DESCRIPTION

Systems and methods are disclosed related to a contactless delivery verification system. Although examples of package or parcel delivery verification are primarily described herein, this is for example purposes and is not intended to be limiting. For example, the systems and methods described herein could be implemented for any exchange of items, goods, products, services, or information—such as food pickup or delivery, item pickup from a store or provider location, information exchange, item delivery (e.g., vehicles, bikes, boats, toys, etc.), service verification (e.g., auto service, heating and cooling service, plumbing service, pest control service, etc.), etc. As such, the systems and methods described herein may be implemented for any exchange of goods, services, food, beverages, and/or other information where verification is desired or required.

Figure 1A:
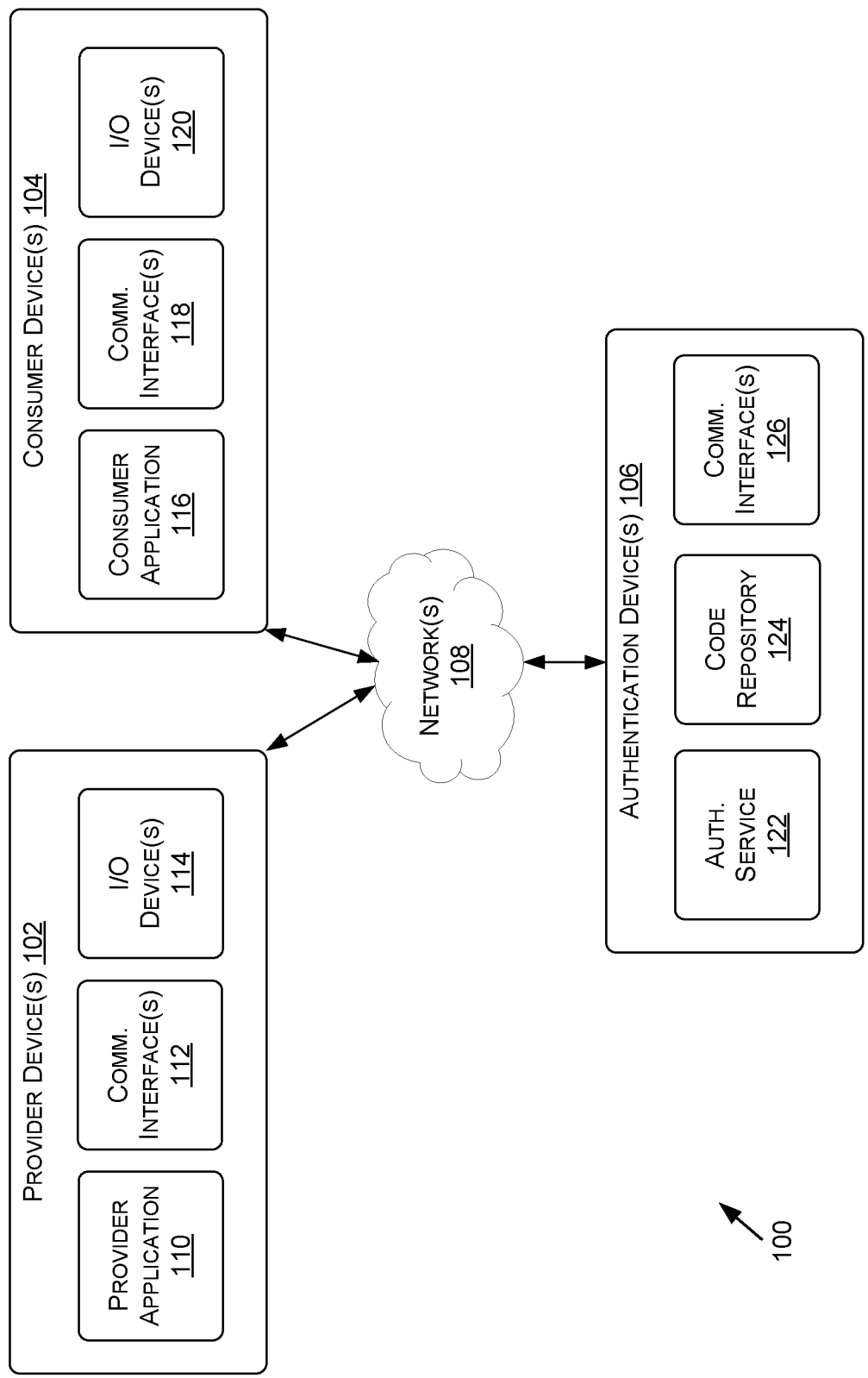
FIG. 1A depicts a block diagram of a contactless delivery verification system, in accordance with some embodiments of the present disclosure.

With reference to FIG. 1, FIG. 1 is an example block diagram for a contactless delivery verification system (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, at least some of the features, functionality, and/or components described herein with respect to FIG. 1A may be implemented using one or more computing devices, such as example computing device 600 of FIG. 6. In other embodiments, at least some of the features, functionality, and/or components described herein with respect to FIG. 1A may be implemented using additional or alternative features, functionality, and/or components other than those described herein with respect to FIG. 6.

The system 100 may include, among other things, a provider device(s) 102, a consumer device(s) 104, and/or an authentication device(s) 106. Although only a single provider device(s) 102, a single consumer device(s) 104, and a single authentication device(s) 106 are illustrated in FIG. 1A, this is not intended to be limiting, and any number of devices may be implemented within the system 100. In addition, although the authentication device(s) 106 is illustrated as a separate device from the consumer device(s) 104 and the provider device(s) 102—e.g., remotely located, in embodiments—this is not intended to be limiting, and the authentication device(s) 106 may correspond to the provider device(s) 102 and/or the consumer device(s) 104.

The provider device(s) 102 and the consumer device(s) 104 may each include a smartphone, a laptop computer, a tablet computer, a desktop computer, a wearable device, a game console, a smart-home device that may include an intelligent personal assistant, a delivery-personnel device (e.g., an electronic proof of delivery (ePOD) device, a delivery information acquisition device (DIAD), etc.), and/or another type of device. In some examples, the provider devices(s) 102 and/or the consumer device(s) 104 may include a combination of devices (e.g., a smartphone and a communicatively coupled smart watch or other wearable device), and the applications associated therewith, including interactions with the application, may be executed using one or more of the devices (e.g., smartphone application pushes notification to smart watch application, user provides input to smart watch, data representative of input is passed to another device of the system 100 via the smartphone).

In some embodiments, such as where the authentication device(s) 106—of the functionality thereof—is included in the provider device(s) 102 and/or the consumer device(s) 104, the authentication device(s) 106 may include similar device types as described herein with respect to the provider device(s) 102 and/or the consumer device(s) 104. In other embodiments—such as where the authentication device(s) 106 is remotely located with respect to the consumer device(s) 104 and/or the provider device(s) 102—the authentication device(s) 106 may include a server(s), network attached storage (NAS), an application programming interface (API), a backend device, and/or another type of device. The authentication device(s) 106 in combination with the provider device(s) 102 and/or the consumer device(s) 104 may correspond to nodes and/or hosts in a cloud-based or distributed computing environment.

The provider device(s) 102, the consumer device(s) 104, the authentication device(s) 106, and/or other components of the system 100 may communicate over network(s) 108. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. For example, the provider device(s) 102 and the consumer device(s) 104 may communicate over one or more ad hoc networks, such as but not limited to: near field communication (NFC) networks; personal area networks (PANs); mobile ad hoc networks (MANETs); smartphone ad hoc networks (SPANs); Bluetooth; Bluetooth Low Energy (BLE); ZigBee; Wi-Fi; and/or other network types or protocols. By communicating over an ad hoc network, or a short range network, the validity of the exchange between the parties may be more easily verifiable as the parties—or their associated devices—may be required to be within a specified range of one another to communicate. In some embodiments, the provider device(s) 102 and/or the consumer device(s) 104 may communicate with the authentication device(s) 106 over a WAN (e.g., the Internet) via a LAN (e.g., Wi-Fi, Ethernet, etc.) and/or a cellular network (e.g., 4G, LTE, 5G, etc.)—e.g., where the system 100 is implemented in a cloud-based or distributed computing environment.

In some embodiments, in addition to communicating over a shorter range, ad hoc network, various connection-based measurements may be leveraged to ensure that certain distance parameters between the various devices are achieved. For a non-limiting example of implementing a connection-based measurement, a received signal strength indicator (RSSI) may be measured by one or more of the communicatively coupled devices, and an estimated distance—which may be specific to the communication protocol—between the devices may be determined based on the RSSI. As such, the connection-based measurements may ensure certain distance requirements between co-located, communicatively coupled devices is met.

Where distance thresholds are implemented, for example, a maximum distance threshold may be set for communications between the provider device(s) 102 and the consumer device(s) 104 to avoid potential deceit between parties (e.g., to avoid one party being too far away and thus more easily able to get away with not delivering a package and saying it has been delivered). As another example, a minimum distance threshold may be set for communications between the provider device(s) 102 and the consumer device(s) 104 such that the two parties do not come too close (e.g., to increase safety and security for both parties, to comply with social distancing measures, to reduce risk of exchange of germs, etc.). In some embodiments, the thresholds not being met—as determined using one or more connection-based measurements, in embodiments—may result in various actions. For example, where a distance threshold is not met, a notification may be provided, such as a push notification, an audible notification, a vibratory notification, etc. via one or more devices indicating the parties should move closer or further away. As another example, features within applications (e.g., provider application 110, consumer application 116, etc.) executing on the devices may be disabled—such as to disable the ability to initiate a delivery, pickup, and/or providing of a service, share authentication codes, or otherwise start, execute, or verify a delivery, exchange, pickup, or service.

The communication interface(s) 112, 118, and/or 126 may include one or more components, features, and/or functionality for communicating across one or more of the networks 108, such as but not limited to those described herein. As a non-limiting example, the provider device(s) 102 and/or the consumer device(s) 104 may use an Ethernet or Wi-Fi connection through a router to access the Internet in order to communicate with the authentication device(s) 106. As another example, the provider device(s) 102 and/or the consumer device(s) 104 may use a cellular network connection to access the Internet in order to communicate with the authentication device(s) 106. In some examples, the provider device(s) 102 and/or the consumer device(s) 104 may communicate directly over one or more ad hoc network types. As such, the communication interface(s) 112, 118, and/or 126 may be configured for communication over one or more network types, and may enable communication between and among the various devices of the system 100 over one or more network types.

The input/output (I/O) device(s) 114, 120 may include any type of devices that are capable of providing inputs, receiving inputs, and/or generating outputs. For example, the input device(s) of the I/O device(s) 114, 120 may include, without limitation, a keyboard, a mouse, a touch-screen display, a controller(s), a remote(s), a headset, a stylus, a microphone, a camera, and/or other types of input devices. The output device(s) of the I/O device(s) 114, 120 may include, without limitation, a speaker, a display, a light source, a haptic feedback device (e.g., a vibration motor), and/or other types of output devices.

The provider device(s) 102 may include a provider application 110. The provider application 110 may be associated with a delivery service (e.g., package and parcel delivery, goods delivery, etc.), a take-out food delivery service (e.g., a third party that delivers food from a variety of restaurants, fast food chains, etc.), a restaurant (e.g., a delivery service that a restaurant provides), a grocery delivery service (e.g., from the grocery store, or a third party), an information delivery service (e.g., for legal documents, medical documents, insurance documents, etc.), a service provider (e.g., mechanic, heating provider, cooling provider, plumbing provider, etc.), a company or provider who manages the authentication service 122, and/or another type of service, provider, and/or company that may enter into or be a component of an exchange of food, alcohol, items, goods, pharmaceutical drugs, services, information, etc. In some embodiments, the provider application 110 may include one of any number of applications on the provider device(s) 102. For example, the provider device(s) 102 may be associated with or managed by the provider of the provider application 110 (e.g., a delivery company may have delivery-specific devices that delivery drivers use to access the provider application 110), and/or may be associated with or managed by a separate provider than the provider application 110 (e.g., the provider device(s) 102 may be owned by an individual who works for a company or provider that manages the provider application 110).

The provider application 110 may be communicatively coupled to the authentication device(s) 106 and the authentication service 122—e.g., after registration—in order to assist in verifying and authenticating exchanges. In some examples, the provider application 110 may correspond to and/or include features and/or functionality that enables interaction with the authentication service 122. For a non-limiting example, where the provider application 110 is associated with a parcel delivery company, the provider application 110 may include a subset of instructions that enable the provider application 110 to communicate with the authentication service 122 (e.g., to transmit codes for verification, to receive codes for transmission, etc.). In other examples, the provider application 110 may correspond to the provider of the authentication service 122 such that when a user provides input to another application on the provider device(s) 102 to verify a delivery, exchange, service, etc., the provider application 110 may be opened (e.g., automatically, responsive to the verification request within the other application) for executing the verification steps between the provider device(s) 102, the consumer device(s) 104, and/or the authentication device(s) 106. As such, the features and/or functionality that enable verification of exchanges with the authentication service 122 may exist as a separate application and/or may be a component of a larger application, depending on the embodiment.

The provider application 110 may enable a user to initiate a delivery, exchange, pickup, or service. For example, the user may select an order number, a parcel number, a tracking number, and/or another identifier for the particular delivery, exchange, pickup, or service within an application—such as the provider application 110—for initiating an order. As another example, the user may capture an image or scan of an identifier, such as a visual fiducial (e.g., a barcode, a QR code, an April Tag, etc.) that may be processed by the provider device(s) 102 and/or by another device (e.g., the authentication device(s) 106, a device associated with the items, food, products, parcel, delivery, service, etc. that is the subject of the exchange) to determine that a delivery, exchange, pickup, and/or service corresponding to the identifier is being initiated. For example, with reference to FIG. 2A, visualization 200A may represent an image captured of a parcel—e.g., parcel 144 of FIG. 1B—that may include a barcode 202. The image including the barcode 202 may then be processed by the system 100 to determine a delivery number, tracking number, order number, and/or other information that is associated with the parcel 144. In some embodiments, and with reference to FIG. 1B, a provider 140 may use the provider device(s) 102 to capture the image of the barcode 202. As a further example, location information or connection information corresponding to a location of the provider device(s) 102 and/or the consumer device(s) 104 may cause initiation of the delivery, pickup, exchange, and/or service. For example, GNSS data (e.g., GPS data), triangulation data using a cellular network, and/or other location information may be used to determine when the provider device(s) 102 and/or the consumer device(s) 104 is within a certain location or region of locations (e.g., within a radius centered at a location of the exchange, pickup, service, etc.). In other embodiments, a network (e.g., a Wi-Fi network) associated with a location of the delivery, pickup, service, etc. becoming discoverable (e.g., a service set identifier (SSID) corresponding to the exchange may become discoverable) to the provider device(s) 102 and/or the consumer device(s) 104 may cause initiation of the exchange (and/or may enable the features within the consumer application 116 and/or the provider application 110 for initiating the exchange).

In some embodiments, such as where the delivery personnel or service provider arrives at a wrong address or wrong location for delivery and/or performing a service, the initial exchange of the code over the ad hoc network between the provider device(s) 102 and the consumer device(s) 104 may result in a validation error—e.g., after attempting to validate the code with the authorization service 122 and/or with a code received therefrom. In example, due to the provider being at the wrong address or location, an ad hoc network connection between the provider device(s) 102 and the consumer device(s) 104 may not be established—e.g., the connection may require authentication based on data received from the authority service 122. As another example, the delivery or service verification process may not proceed beyond the initial attempt by a provider device(s) 102 to begin the delivery confirmation process. For example, location data—e.g., from GNSS, triangulation, etc.—may be analyzed to determine whether the provider device(s) 102 is at a proper location associated with the delivery or service, and when a determination is made the provider device(s) 102 is at the wrong location, the process of delivery or service confirmation may be aborted. In such an example, the provider may scan a fiducial marker on a package, provide an input to the provider application indicating the initiation of the delivery or service confirmation, and/or otherwise attempt to initiate the exchange, and the system 100 may verify location information associated with the exchange to either verify the provider device(s) 102 is at the proper location or verify that the provider device(s) 102 is not at the proper location.

Once a delivery or exchange is initiated, this information may be sent to the authentication service 122 (e.g., over the network(s) 108), and the authentication service 122 may generate and/or transmit codes from a code repository 124 to the provider device(s) 102 and/or the consumer device(s) 104. For example, the authentication service 122 may generate a delivery or provider code for transmission to the provider device(s) 102 and a consumer or receiver code for transmission to the consumer device(s) 104. As such, the provider application 110 and the consumer application 116 may receive the respective codes—e.g., in encrypted form, in embodiments—using the communication interfaces 112 and 118, respectively. The code repository 124 may store the associated devices and/or order information with the respective codes for later verification of the exchange.

The authentication device(s) 106 may include one or more APIs to enable communication between the authentication service 122 and the consumer application 116 and/or the provider application 110. For example, the authentication service 122 may generate and/or transmit codes, and may receive codes to be verified against the generated and/or transmitted codes. The authentication service 122 may further store and/or have access to (e.g., via one or more APIs) order, exchange, delivery, and/or other information corresponding to the exchange or delivery. In addition, any number of service providers, companies, restaurants, etc. may be able to access the authentication service 122 to request that a particular order, delivery, service, and/or exchange be verified, and/or may be able to access the authentication service 122 at any point after a verification request is started until a verification—or invalid verification—is completed. The authentication service 122 of the authentication device(s) 106 may manage the code repository 124 for generating new codes, storing codes, cross-checking codes for verification, and/or the like.

The consumer application 116 may be communicatively coupled to the authentication device(s) 106 and the authentication service 122—e.g., after registration—in order to assist in verifying and authenticating exchanges. In some examples, the consumer application 116 may correspond to and/or include features and/or functionality that enables interaction with the authentication service 122. For a non-limiting example, where the consumer application 116 is associated with an online shopping application, the consumer application 116 may include a subset of instructions that enable the consumer application 116 to communicate with the authentication service 122 (e.g., to receive codes for verification). In other examples, the consumer application 116 may correspond to the provider of the authentication service 122 such that when a user provides input to another application on the consumer device(s) 104 that a delivery or exchange is to be verified, the consumer application 116 may be opened (e.g., automatically, responsive to the verification request within the other application) for executing the verification steps between the provider device(s) 102, the consumer device(s) 104, and/or the authentication device(s) 106. As such, the features and/or functionality that enable verification of exchanges with the authentication service 122 may exist as a separate application and/or may be a component of a larger application, depending on the embodiment.

Once the delivery or exchange has been initiated, the consumer device(s) 104 may receive data indicative of the same, and may notify the consumer via the consumer device(s) 104. In some embodiments, receipt of a code from the authentication service 122 may indicate the initiation of a delivery, exchange, pickup, and/or service to the consumer device(s) 104, while in other embodiments additional data indicating the initiation of an exchange may be received by the consumer device(s) 104 from the authentication device(s) 106. The notification to the consumer via the consumer device(s) 104 may include an audible notification, a haptic feedback notification, a push notification, an update to a notification indicator (e.g., update a notification number corresponding to the consumer application 116), automatically launching the consumer application 116 (e.g., to a graphical user interface (GUI) for delivery verifications), and/or another type of notification. For example, and with respect to visualization 300A of FIG. 3A, a push notification 302 may be generated and displayed on a display of the consumer device(s) 104. The push notification 302 may indicate to the consumer—e.g., consumer 142 of FIG. 1B—that a delivery, exchange, pickup, and/or service has been initiated, so that the consumer can prepare to participate. The consumer may select the push notification 302, and the selection may cause the launch of the consumer application 116 to a GUI or other portion of the application that corresponds to the delivery or exchange.

Once the verification portion or GUI of the consumer application 116 associated with the verification has been accessed, launched, and displayed on the consumer device(s) 104, the user may pass the code received from the authentication service 122 to the provider device(s) 102 over an ad hoc network. In order to pass the code over the ad hoc network, a communicative coupling may take place between the consumer device(s) 104 and the provider device(s) 102 over the ad hoc network. For example, the consumer device(s) 104 and/or the provider device(s) 102 may generate and broadcast themselves—e.g., via an ad hoc network—for the other device to connect to. For a non-limiting example, the consumer device(s) 104 and/or the provider device(s) 102 may generate an ad hoc network (e.g., Wi-Fi), and/or may otherwise make themselves discoverable (e.g., via Bluetooth, BLE, NFC, etc.). The consumer device(s) 104 and/or the provider device(s) 102 may then be connected via user connection (e.g., accessing settings, selecting the other device and/or the other device's broadcast ad hoc network, and connecting), via a pop up notification or other selective option (e.g., a popup within the consumer application 116 and/or the provider application 110 may indicate "Connect to user's device via Network X" or "Connect to [Username's] Device"), and/or automatically (e.g., the authentication service 122 and/or another service or application may share the discoverable information of one or more of the devices, may cause at least one of the devices to generate an ad hoc network, may cause at least one of the devices to become discoverable to the other, etc., and the connection may happen automatically without requiring user input). In some embodiments, such as where the provider device(s) 102 and/or the consumer device(s) 104 is not currently configured for communication across the protocol or network type associated with the ad hoc network, the user may be notified to activate the setting corresponding to the protocol or network type, may be provided with a selectable option to active the setting, etc. In some embodiments, once a connection is established between the devices, a notification, indicator, and/or the like may be generated to indicate that a connection is established. For example, one or more functions of the consumer application 116 and/or the provider application 110 may not be active and/or selectable until a connection is established. As an example, and with reference to visualization 300B of FIG. 3B, a graphical element 304 associated with passing a verification code 306 to the provider device(s) 102 may not be selectable until after the connection is established. In other examples, the graphical element 304 may be selectable, but the consumer application 116 may hold the transmit operation in a queue until a connection is established.

Figures 3A, 3B:
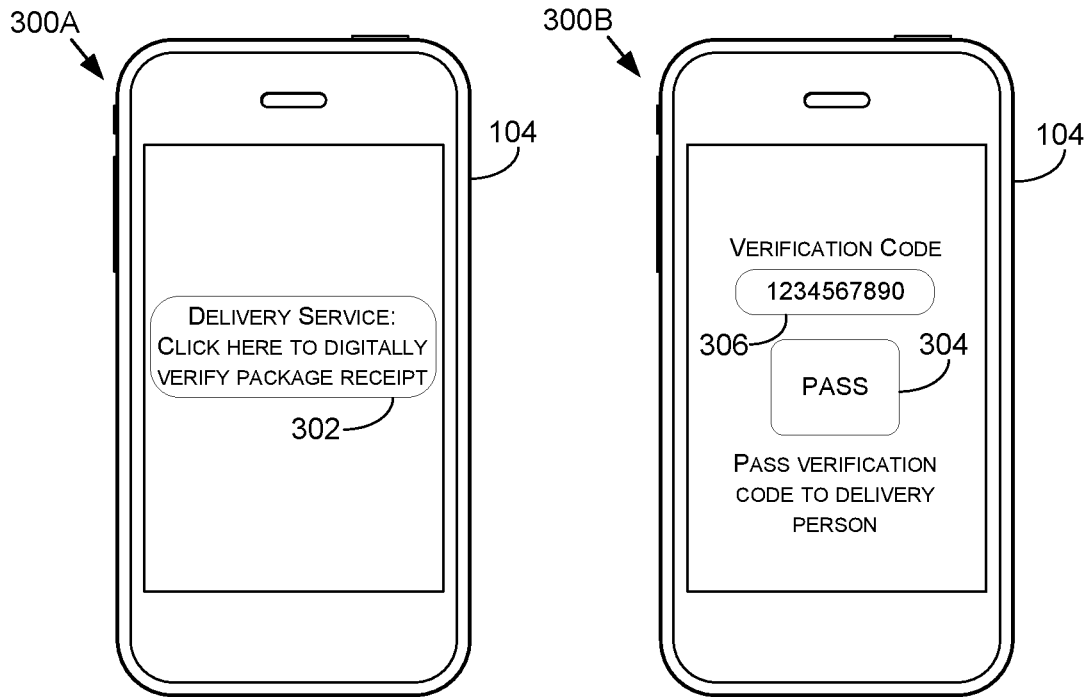
FIGS. 3A-3D depict example screenshots of a consumer application at various stages of an exchange, in accordance with some embodiments of the present disclosure.

Once a connection is established, and with reference to FIGS. 1B and 3B, the consumer 142 may select the graphical element 304 to cause the verification code 306 to be passed to the provider device(s) 102 over the ad hoc network. The verification code 306 may then be passed to the provider device(s) 102, and the verification code 306 may be displayed within the provider application 110 of the provider device(s) 102. For example, and with reference to FIGS. 1B and 2B (e.g., visualization 200B), the verification code 306 may be displayed on the provider device(s) 102 once it is received from the consumer device(s) 104. The display of the verification code 306 may indicate to the provider 140 that the code has been received. In some examples, graphical element 204—configured to cause verification of the verification code 306—may not be selectable until after the verification code 306 is received.

In some embodiments, in addition to or alternatively from an alphanumeric code, the verification code may include a signature of the consumer (e.g., where a consumer opts in to this type of feature). For example, the customer may digitally sign their signature within the consumer application 116, and the signature may be transmitted—e.g., in encrypted form—to the provider device(s) 102. The signature may then be cross checked and verified against a stored version of the consumer's signature in the code repository 124, on the authentication device(s) 106, and/or on the provider device(s) 102. For a non-limiting example, each signature (and/or code) associated with each delivery for a given driver for a day may be stored on the provider device(s) 102 (e.g., after receipt from the authentication service 122), and the signatures (and/or codes) may be cross checked by the provider device(s) 102 upon receipt from the consumer device(s) 104 over the ad hoc network.

In some embodiments, in order to send the code to the provider device(s) 102, additional data or verification may be requested on the consumer device(s) 104. For example, a passcode and/or password may be required, a facial recognition algorithm may be executed using a camera of the consumer device(s) 104, a fingerprint verification algorithm may be executed using a fingerprint scanner of the consumer device(s) 104, and/or another type of biometric data verification method may be executed using the consumer device(s) 104. In some embodiments, the components and methods for verification may be similar to those used for mobile pay, logging into a device, order verifications, etc.—e.g., where the biometric data is not shared, but stored locally on the device to respect data privacy concerns. Although described with respect to the consumer device(s) 104, this extra verification and validation may additionally or alternatively be executed on the provider device(s) 102 prior to transmitting and/or receiving codes for verification. In any example where biometric data is analyzed or used, users may have the option to opt-in to this verification. Where additional verification is used, this may remove the ability for a person to use the actual consumer's device to receive an order, pickup, service, etc., because some additional information may have to be verified—e.g., locally—on the device(s) prior to receiving and/or transmitting verification codes.

Once the code is received by the provider device(s) 102 from the consumer device(s) 104 over the ad hoc network, the code may be verified. For example, and with respect to FIGS. 1B and 2B, the provider 140 may select to verify the verification code 306 within the provider application 110, or the verification code 306 may be verified automatically upon receipt. In order to verify the verification code 306, the provider device(s) 102 may cross check the verification code 206 against a stored verification code corresponding to the order, delivery, exchange, service, consumer device(s) 104, etc. For example, the provider device(s) 102 may have received the same verification code 306 that was transmitted to the consumer device(s) 104—e.g., at substantially the same time that it was transmitted to the consumer device(s) 104 from the authentication service 122, after requesting the code from the authentication service 122 at some point prior to or during the delivery, pickup, service, exchange (e.g., in response to receiving the verification code 306 from the consumer device(s) 104 over the ad hoc network), during startup or booting of the provider application 110 and/or the provider device(s) 102, as a code of a plurality of codes stored on the provider device(s) 102 as an authenticator (e.g., implementing a time-based one-time password algorithm, HMAC one-time password algorithm, a synchronous password token algorithm, an asynchronous password token, a challenge response token algorithm, and/or another algorithm), etc. In some embodiments, as described herein, the authentication service 122—or at least a portion thereof—may be executed by the provider device(s) 102 and, as a result, the verification code 306 may have been generated by the provider application 110, transmitted to the consumer device(s) 104, and/or verified by the provider application 110.

Once the verification request has been made by the provider device(s) 102, the code may be cross checked—e.g., using the code repository 124—against the known correct code that was transmitted to the consumer device(s) 104. If the code does not match, the transaction may be invalidated, and a notification may be provided of the same to the provider device(s) 102, the consumer device(s) 104, and/or the authentication device(s) 106. If the code does match, a notification may be provided of the same to the provider device(s) 102, the consumer device(s) 104, and/or the authentication device(s) 106. For example, an indicator of verification may be displayed on the consumer device(s) 102 and/or the provider device(s) 102 based on receiving and/or determining that the code is verified. The verification of the code may prompt additional steps in the verification process.

For example, once the code that was transmitted to the consumer device(s) 104 is verified, the code that was transmitted to the provider device(s) 102 from the authentication service 122 may be verified. To accomplish this, the provider device(s) 102 may transit the code to the consumer device(s) 104 via the ad hoc network—e.g., via the already established connection and/or another connection. For example, and with respect to visualization 200C of FIG. 2C, graphical element 206 may be selected, and verification code 208 (e.g., driver code corresponding to the provider 140 of FIG. 1B) may be transmitted to the consumer device(s) 104. In other embodiments, the verification code 208 may be transmitted automatically—e.g., without user input—similar to the description herein with respect to the verification code 306.

Figures 3C, 3D:
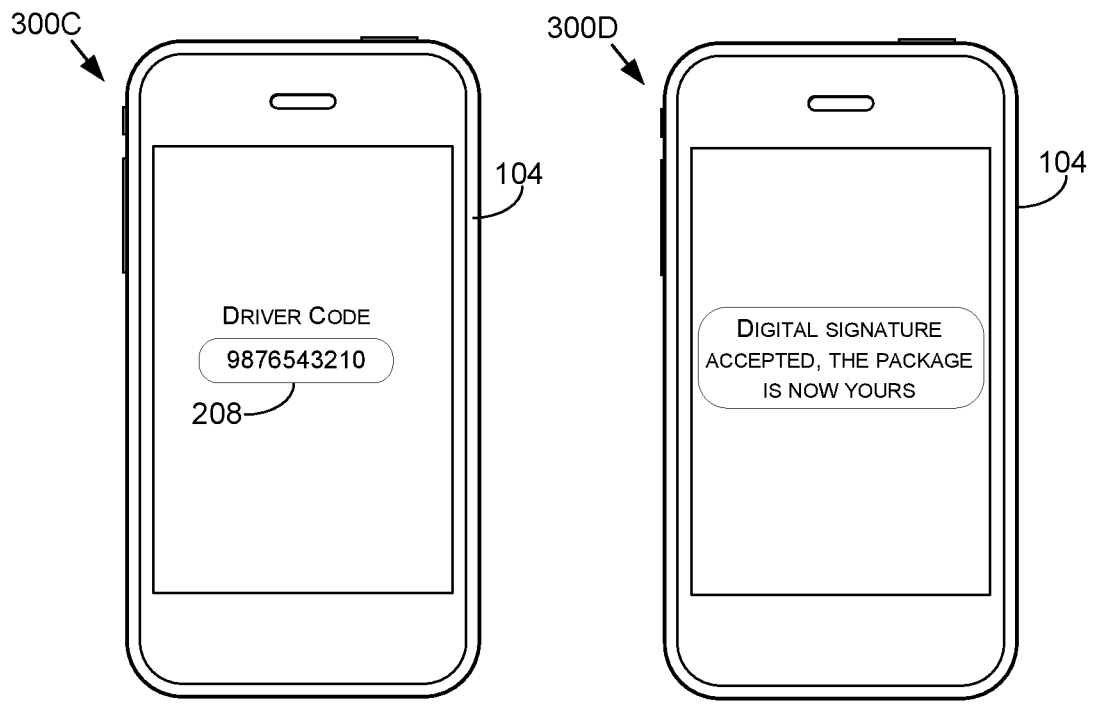

Once the code is passed to the consumer device(s) 104, the code may be displayed within the consumer application 116—e.g., within a GUI of the consumer application 116. As an example, and with respect to visualization 300C of FIG. 3C, the verification code 208 may be displayed within the consumer application 116 on the consumer device(s) 104. The user of the consumer device(s) 104—e.g., the consumer 142 of FIG. 1B—may then aid in verifying the code. For example, similar to the verification code 306, the verification code 208 may be verified by the authentication service 122. In such examples, the consumer device(s) 104 may transmit the verification code 208 to the authentication service 122 for cross checking with the code repository 124. In other examples, the verification may happen locally. For example, and with respect to FIGS. 1B and 2D (e.g., visualization 200D), the consumer 142 may read aloud the verification code 208 and the provider may enter the verification code 208 into a code entry box 212 using a keypad 210 (e.g., a numeric keypad, an alpha keypad, an alphanumeric keypad, etc.). In other examples, the consumer 142 may read aloud the verification and a talk-to-text feature of the provider application 110 may convert the speech to text to be entered as the verification code 208.

The verification code 208 may be verified against the known code stored in a code repository of the authentication device(s) 106 and/or the provider device(s) 102. For example, the consumer device(s) 104, as described herein, may transmit the verification code 208 for verification by the authentication service 122, the provider device(s) 102 may transmit the verification code 208 for verification by the authentication service 122, and/or the provider device(s) 102 may verify the verification code 208 locally. In this way, an additional verification step is provided that may allow the consumer an additional verification as to the presence of the delivery, item, service provider, etc., the state of the delivery (e.g., not damaged, proper order, etc.), and/or the quality of the overall delivery, exchange, service, and/or pickup. In addition, if, for example, a delivery person steals the subject of the delivery—e.g., a package—the consumer may not provide the verification of the driver code (e.g., the verification code 208). In examples where a customer does not provide the final verification—e.g., the verification code 208—the provider may use the provider device(s) 102 to capture an image of the consumer and/or the package to verify delivery and that the consumer had receipt. However, even where an image is not captured—e.g., due to privacy concerns or other issues—the first step of the verification may provide enough evidence that the consumer and the provider were connected via an ad hoc network, thereby indicating that a successful exchange or delivery took place.

After verification—e.g., two step verification via the two verification codes 208 and 306—a notification of the same may be generated and/or provided (e.g., audibly, visibly, via tactile response, etc.) via the consumer application 116 and/or the provider application 110. For example, and with respect to visualization 300D of FIG. 3D, a notification 308 may be displayed on the consumer device(s) 104 indicating that the delivery, exchange, service, and/or pickup was accepted or verified. As such, with respect to FIG. 1B, the consumer 142 may now establish possession of the parcel 144, and the consumer 142 may retrieve the parcel 144— e.g., once the provider 140 is outside of a desired distance from the parcel 144 due to social distancing, security, or safety considerations.

Figure 4:
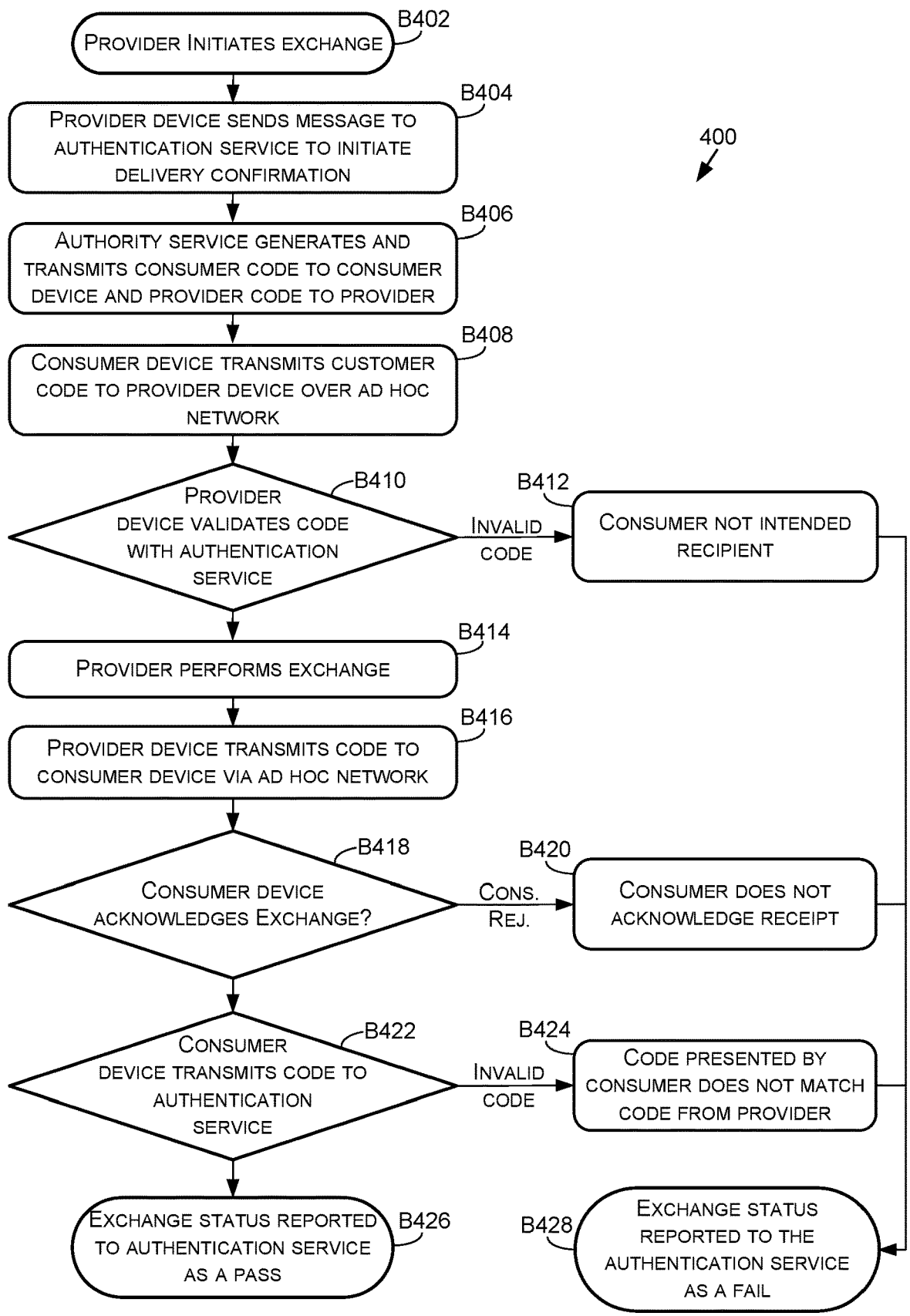
FIG. 4 depicts an example flow diagram for a method of contactless delivery verification, in accordance with some embodiments of the present disclosure.
Figure 5:
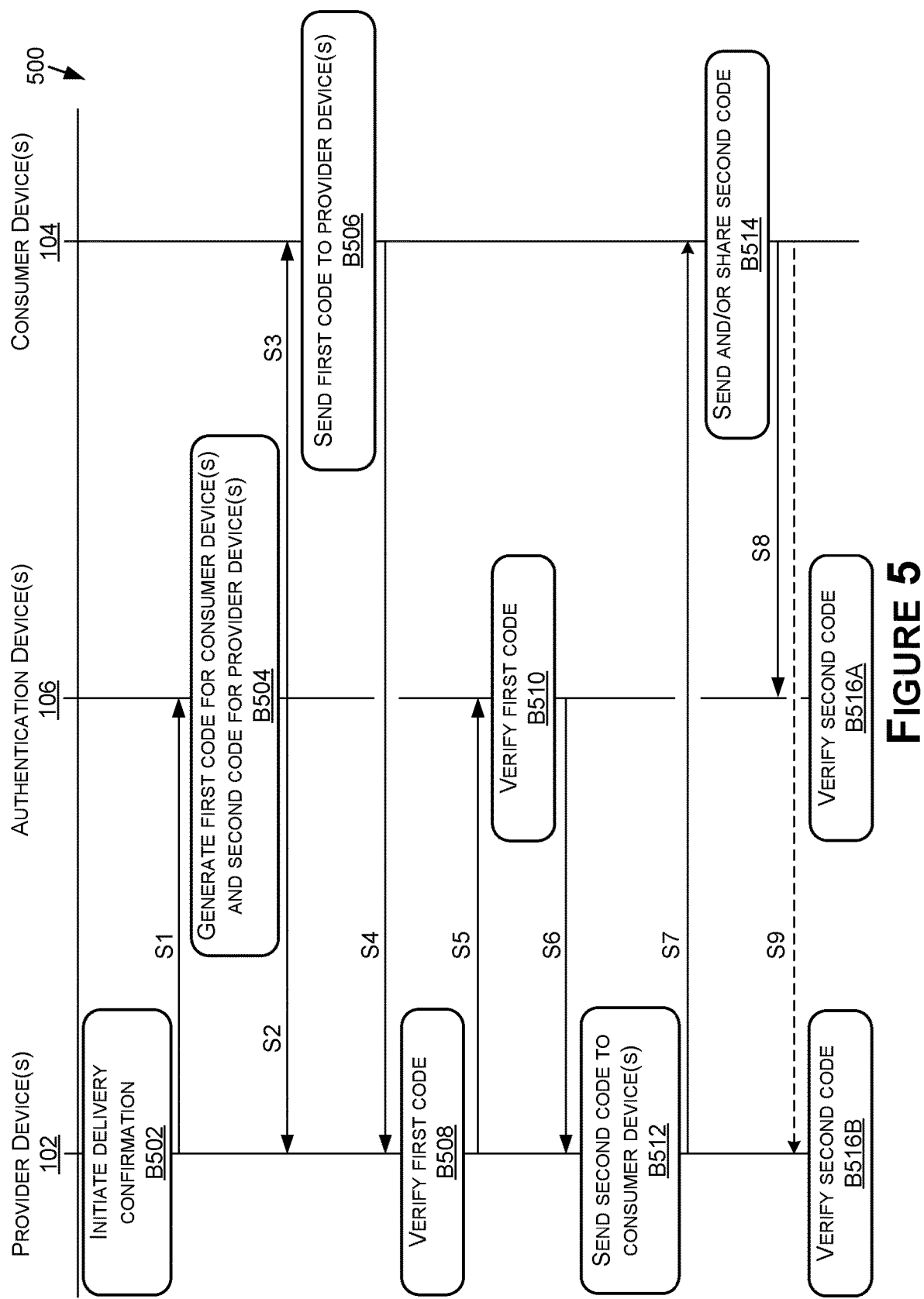
FIG. 5 depicts an example signal diagram for a method of contactless delivery verification, in accordance with some embodiments of the present disclosure.

Now referring to FIGS. 4 and 5, each block of methods 400 and 500, described herein, comprises a computing process that may be performed using any combination of hardware, firmware, and/or software. For instance, various functions may be carried out by a processor executing instructions stored in memory. The methods 400 and 500 may also be embodied as computer-usable instructions stored on computer storage media. The methods 400 and 500 may be provided by a standalone application, a service or hosted service (standalone or in combination with another hosted service), or a plug-in to another product, to name a few. In addition, the method 4 and 500 are described, by way of example, with respect to the system 100 of FIG. 1A. However, these methods 400 and 500 may additionally or alternatively be executed by any one system, or any combination of systems, including, but not limited to, those described herein.

Now referring to FIG. 4, FIG. 4 depicts an example flow diagram for a method 400 of contactless delivery verification, in accordance with some embodiments of the present disclosure. The method 400, at block B402, includes a provider initiating a confirmation of an exchange, delivery, pickup, service, etc. For example, a provider may provide input to the provider application 110, may capture an image, and/or may otherwise indicate the initiation. At block B404, the provider device(s) 102 may transmit data representative of the initiation to the authentication service 122. At block B406, the authentication service 122 (e.g., via the authentication device(s) 106) may generate and/or retrieve a code for the provider device(s) 102 and for the consumer device(s) 104, and transmit the same to the respective devices. At block B408, the consumer device(s) 104 may transmit the received code (e.g., verification code 306 of FIG. 3B) to the provider device(s) 102 via an ad hoc network and, at block B410, the provider device(s) 102 may receive the code and determine whether the code is validated with the authentication service 122. Where the code is determined to be invalid, the method 400 may continue to block B412 where a determination may be made that the consumer device(s) 104 does not correspond to the intended recipient, and the exchange status may be reported to the authentication service 122 (and/or the company, the provider, the restaurant, and/or to other parties to the transaction) as failed (at block B428).

Where the code is determined to be valid, at block B414, the provider may perform the exchange, delivery, pickup, service, etc. (e.g., the provider may deliver the package, perform the service, hand over the goods, etc.). At block B416, the consumer device(s) 104 may be used by the consumer to acknowledge or confirm the exchange, delivery, pickup, service, etc. For example, the consumer device(s) 104 may be used to indicate that the exchange, service, etc. was not provided, or was inadequately provided (e.g., damaged goods, the provider had malicious intent, etc.). Where the exchange, service, delivery, etc. was inadequate, at block B420, the consumer may not acknowledge receipt (e.g., by not performing another action, by performing another action indicating the inadequate, incomplete, or unsatisfactory exchange, etc.), and the exchange status may be reported to the authentication service 122 as failed (at block B428).

Where the exchange status is reported as adequate, completed, satisfactory, etc., at block B422, the consumer device(s) 104 may transmit the code received from the provider device(s) 102 to the authentication service 122 to verify that the exchange was acknowledged. In some embodiments, the code may be given back to the provider (e.g., via word of mouth) and the provider may enter the code into the provider application 110. The code may then be verified via the authentication service 122 and/or based on a comparison by the provider application 110 of the entered code to the transmitted code. Where the code is determined to be invalid, the method 400 may continue to block B424 where a determination may be made that the code presented by the consumer does not match that of the provider, and the exchange status may be reported to the authentication service 122 as failed (at block B428). Where the code is determined to be valid at block B422, the method 500 may continue to block B426, where the exchange status may be reported to the authentication service 122 as a pass or success.

Now referring to FIG. 5, FIG. 5 depicts an example signal diagram for a method 500 of contactless delivery verification, in accordance with some embodiments of the present disclosure. The method 500, at block B502, includes initiating delivery confirmation by the provider device(s) 102. A signal, S1, may be transmitted from the provider device(s) 102 to the authentication device(s) 106 indicating that the delivery confirmation has been initiated. At block B504, the authentication device(s) 106 may generate codes for the consumer device(s) 104 and/or the provider device(s) 102. The signal, S2, may represent the second code for the provider device(s) 102 and the signal, S3, may represent the first code for the consumer device(s) 104. At block B506, the consumer device(s) 104 may send the first code to the provider device(s) 102. As such, the signal, S4, may represent the first code being sent from the consumer device(s) 104 to the provider device(s) 102 over an ad hoc network. At block B508, the provider device(s) 102 may verify the first code by transmitting, via signal, S5, data representative of the first code to the authentication device(s) 106. At block B510, the authentication device(s) 106 may verify the first code, and send a signal, S6, representative of the verification to the provider device(s) 102. At block B512, the provider device(s) 102 may send the second code to the consumer device(s) 104, via signal, S7. The consumer device(s) 104 may then send the second code, via signal, S8, to the authentication device(s) 106 for verification at block B516A, and/or the consumer may share the code (e.g., via word of mouth, indicated by dashed lines of the signal, S9) with the provider to be entered into the provider device(s) 102. The second code may then be verified by the provider device(s) 102 at block B516B (which may include an additional signal representative of the second code being transmitted to the authentication device(s) 106, in some embodiments).

Example Computing Device

Figure 6:
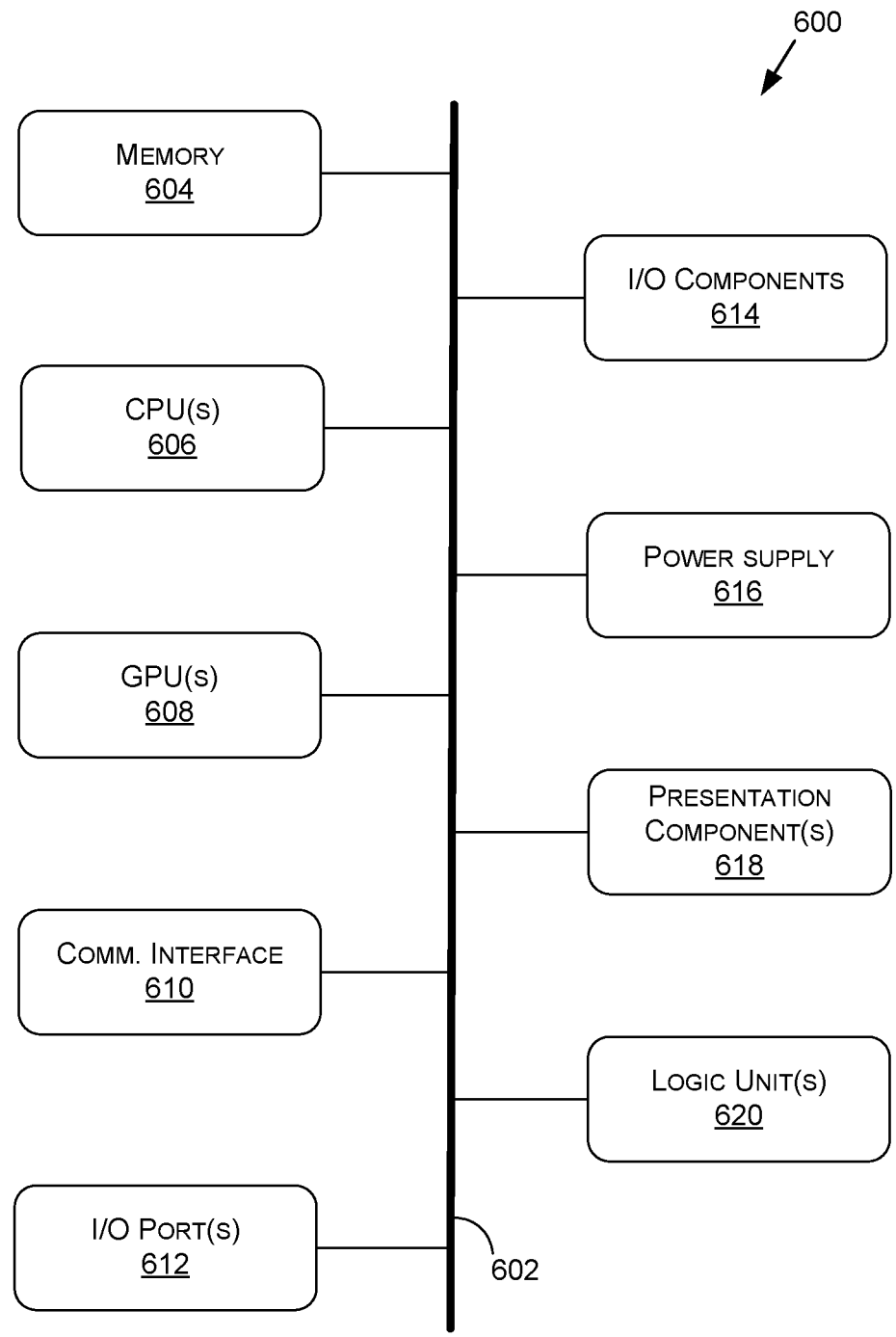
FIG. 6 depicts a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types.

The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   initiating, within a provider application executing on a first client device, a delivery confirmation for an item;
   sending, using the first client device and to an authentication service, data representative of the initiating the delivery confirmation;
   receiving, using the first client device and from a second client device, over a network, a first authentication code generated by the authentication service, the first authentication code being associated with the delivery confirmation;
   sending, using the first client device and to the authentication service, the first authentication code;
   receiving, using the first client device and from the authentication service, a verification associated with the first authentication code;
   receiving, using the first client device and from the authentication service, a second authentication code associated with the delivery confirmation; and
   sending, using the first client device and to the second client device, over the network, the second authentication code.

2. The method of claim 1, wherein the initiating the delivery confirmation includes:
   receiving image data generated by a camera of the first client device; and
   identifying one of a barcode or a QR code represented by the image data.

3. The method of claim 1, wherein the network includes at least one of a personal area network (PAN), a local area network (LAN), a low power wide area network (LPWAN), or a near field communication network.

4. The method of claim 1, wherein the receiving the first authentication code is responsive to an input to the second client device indicative of a request to send the first authentication code.

5. The method of claim 1, wherein the authentication service is hosted by a device remotely located with respect to the first client device and the second client device, and the sending to the authentication service is via at least one of a cellular network, a local area network, or a wide area network.

6. The method of claim 1, further comprising establishing, using the first client device, a connection to the second client device over the network.

7. The method of claim 1, further comprising:
   displaying, using the first client device, a notification associated with the second authentication code; and
   receiving, using the first client device, input data representative of an input associated with sending the second authentication code,
   wherein the sending of the second authentication code is based at least on the input data.

8. A method comprising
   receiving, using a first client device and from an authentication service, a first authentication code, the first authentication code associated with a delivery confirmation;
   based at least on the first authentication code, generating a notification within an application on the first client device, the notification indicative of the delivery confirmation;
   sending, using the first client device and to a second client device, over a network, the first authentication code;
   receiving, using the first client device and from the second client device, over the network, a second authentication code generated by the authentication service, the second authentication code associated with the delivery confirmation; and
   sending, using the first client device and to the authentication service, the second authentication code.

9. The method of claim 8, further comprising, based at least on the sending the second authentication code, generating a second notification within the application, the second notification indicative of the delivery confirmation is verified.

10. The method of claim 8, further comprising establishing, using the first client device, a connection to the second client device over the network.

11. The method of claim 8, wherein the network includes at least one of a personal area network (PAN), a local area network (LAN), a low power wide area network (LPWAN), or a near field communication network.

12. The method of claim 8, wherein the generating the notification within the application includes at least one of generating a push notification, updating a notification indicator associated with the application, or generating a message for transmission to a messaging application of the first client device.

13. The method of claim 8, further comprising:
   determining that a setting of the first client device associated with the network is deactivated;
   generating a second notification indicative of the setting being deactivated;
   receiving input data representative of an input, the input indicative of a request to activate the setting; and
   activating the setting,
   wherein the sending the first authentication code is based at least on the activating.

14. The method of claim 8, wherein the sending of the second authentication code is associated with verifying the second authentication code with the authentication service.

15. The method of claim 8, further comprising:
displaying, using the first client device, a second notification associated with verifying the delivery confirmation; and
receiving, using the first client device, input data representative of an input associated with the verifying of the delivery confirmation,
wherein the sending of the second authentication code is based at least on the input data.

16. A system comprising:
one or more processing units to:
receive, from a first client device, data indicative of initiation of a delivery confirmation;
send, to a second client device, a first authentication code associated with the delivery confirmation;
send, to the first client device, a second confirmation code associated with the delivery confirmation;
receive, from the first client device, the first authentication code based at least on the first client device receiving the first authentication code from the second client device;
verify, based at least on the first authentication code received form the first client device, at least one of the second client device or a customer associated with the second client device;
receive, from the second client device, the second authentication code based at least on the second client device receiving the second authentication code from the first client device; and
verify the delivery confirmation based at least on the second authentication code received from the second client device.

17. The system of claim 16, wherein the data includes image data representative of an image of an item associated with the delivery confirmation, and wherein the one or more processing units are further to:
identify an order based at least on the image data; and
determine the second client device based at least on the order.

18. The system of claim 16, wherein the one or more processing units are further to:
receive, from the first client device, data indicative of initiation of a second delivery confirmation;
send, to a third client device, a third authentication code;
receive, from the first client device, a fourth authentication code;
determine, based at least on the third authentication code not matching the fourth authentication code, that the second delivery confirmation is not verified; and
send, to the first client device, data indicative of the second delivery confirmation not being verified.

19. The system of claim 16, wherein the first client device and the second client device are communicatively coupled via an ad hoc network.

20. The system of claim 16, wherein the one or more processing units are further to generating the first authentication code and the second authentication code before the sending of the first authentication code and the sending of the second authentication code.

\* \* \* \* \*